Dec. 2, 1930. C. Q. GAREY 1,783,566
SPINDLE STOPPING MECHANISM FOR METAL WORKING MACHINES
Filed June 19, 1928 3 Sheets-Sheet 2
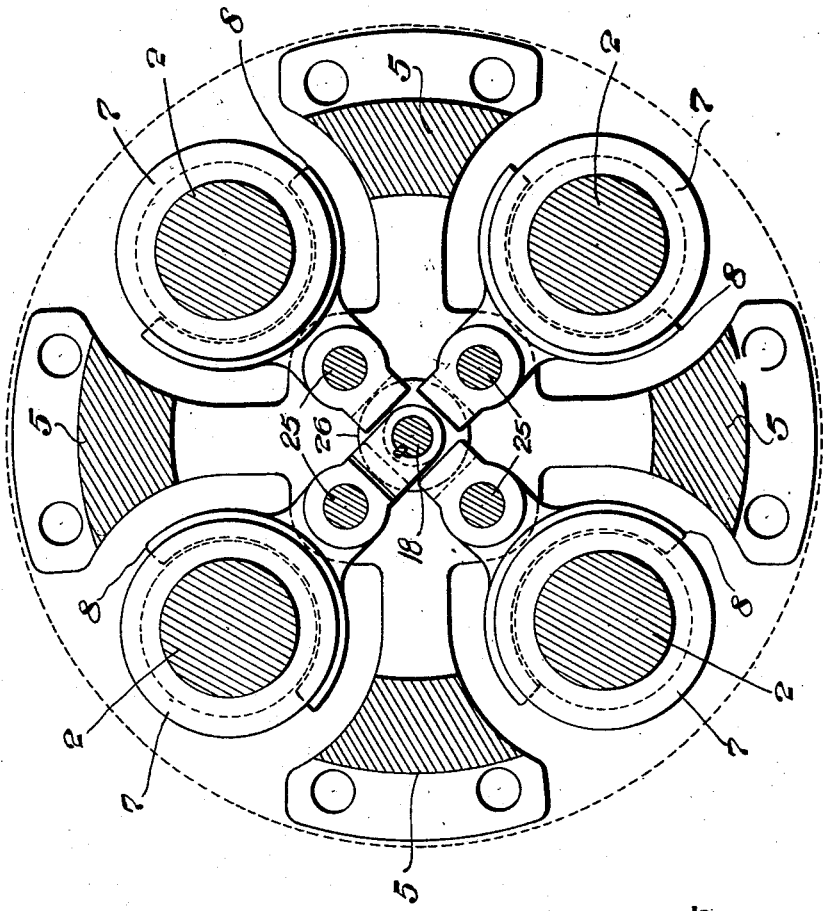
Fig. 2.
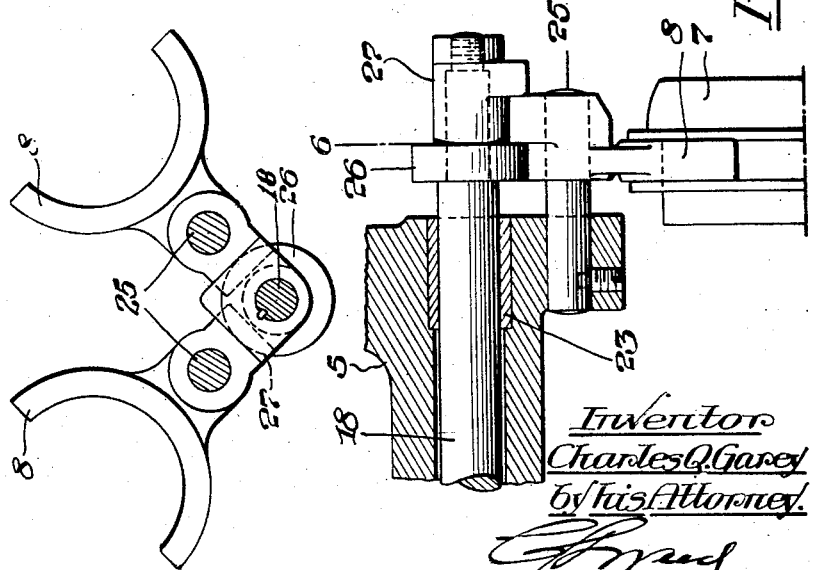
Fig. 4.
Fig. 3.
Inventor
Charles Q. Garey
by his Attorney.

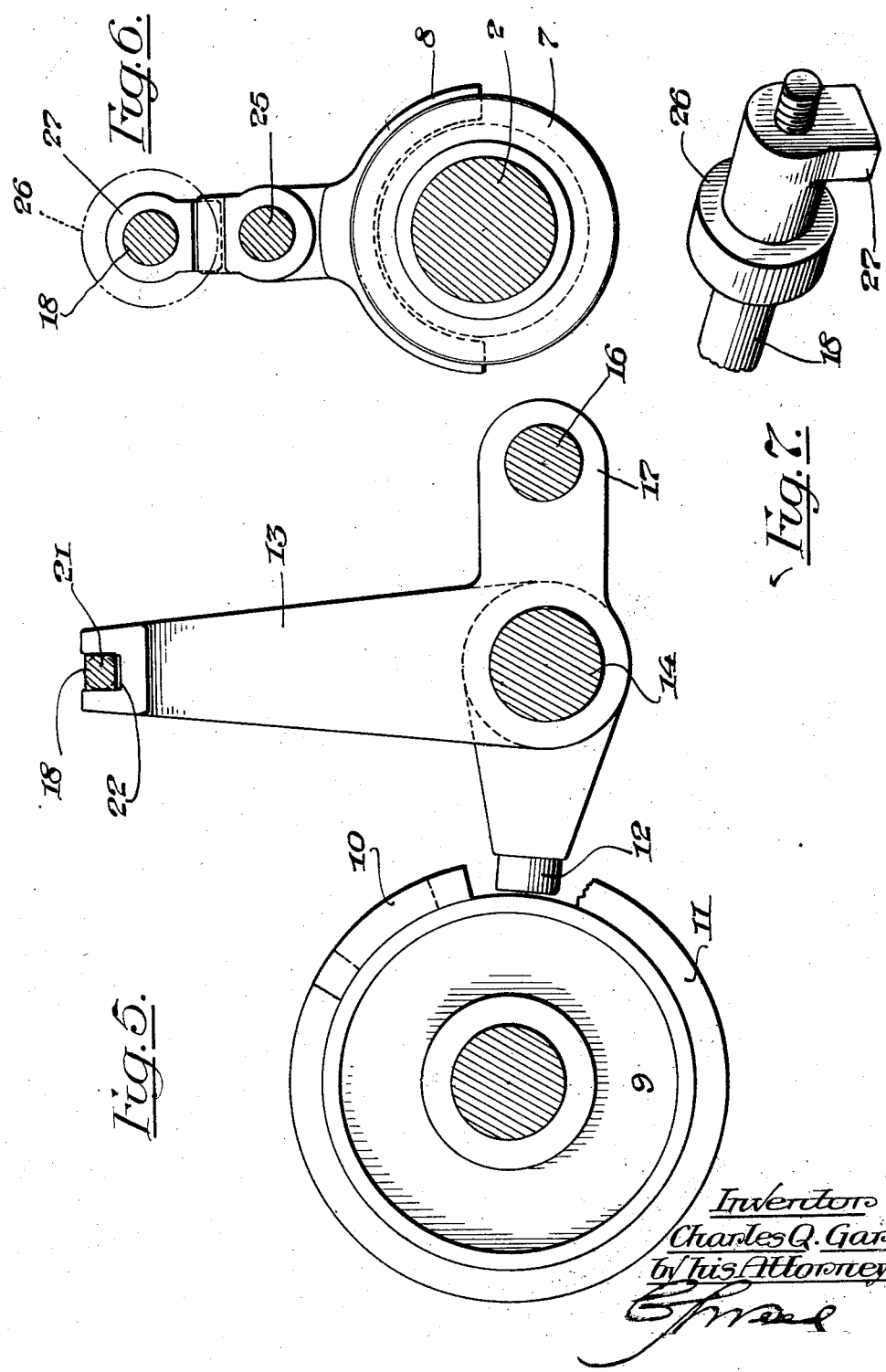

Patented Dec. 2, 1930

1,783,566

UNITED STATES PATENT OFFICE

CHARLES Q. GAREY, OF WINDSOR, VERMONT, ASSIGNOR TO THE NATIONAL ACME COMPANY, OF CLEVELAND, OHIO, A CORPORATION OF OHIO

SPINDLE-STOPPING MECHANISM FOR METAL-WORKING MACHINES

Application filed June 19, 1928. Serial No. 286,564.

This invention relates to metal working machines, more particularly to the spindle stopping mechanism therefor, which in the present instance is shown applied to a chucking machine, such as a "Gridley" chucking machine, the object of the invention being to provide an improved spindle stopping mechanism adjustable or fixable in different positions whereby each spindle can be stopped in any indexed position during the indexing thereof or a plurality thereof, can be stopped at the same time, thereby permitting chucking, end milling, cross drilling, eccentric drilling, etc., to be effectively done and by means of which the stopping of more than one spindle can be accomplished with the same mechanism and without the addition of similar independent mechanisms.

A further object of the invention is the provision of an improved spindle stopping mechanism simple in construction, efficient in use, easily applied and consisting of but few parts.

Heretofore in chucking machines, where it was desired to stop more than one spindle, a separate and distinct mechanism had to be applied for each spindle to accomplish this result, but in the present improvement the same mechanism is effective to stop the spindles in any of their indexed positions or to stop several of such spindles at the same time.

In the drawings accompanying and forming part of this specification—

Fig. 2 is a cross-sectional view taken on line 2—2, Fig. 1, and illustrates the stopping of a spindle in the second position;

Fig. 3 is a detail partly sectional view of the clutch shifter and the means for operating the same;

Fig. 4 is a detail view of a pair of clutch shifters intended to be operated simultaneously by this improved mechanism;

Fig. 5 is a partly sectional view of the cam drum and the sliding arm operated thereby for shifting the clutch shifter;

Fig. 6 is a partly sectional view of the clutch shifter taken on line 6—6, Fig. 3, and Fig. 7 is a detail sectional view of the means for operating the clutch shifter.

Similar characters of reference indicate corresponding parts in the several views.

Figure 1:
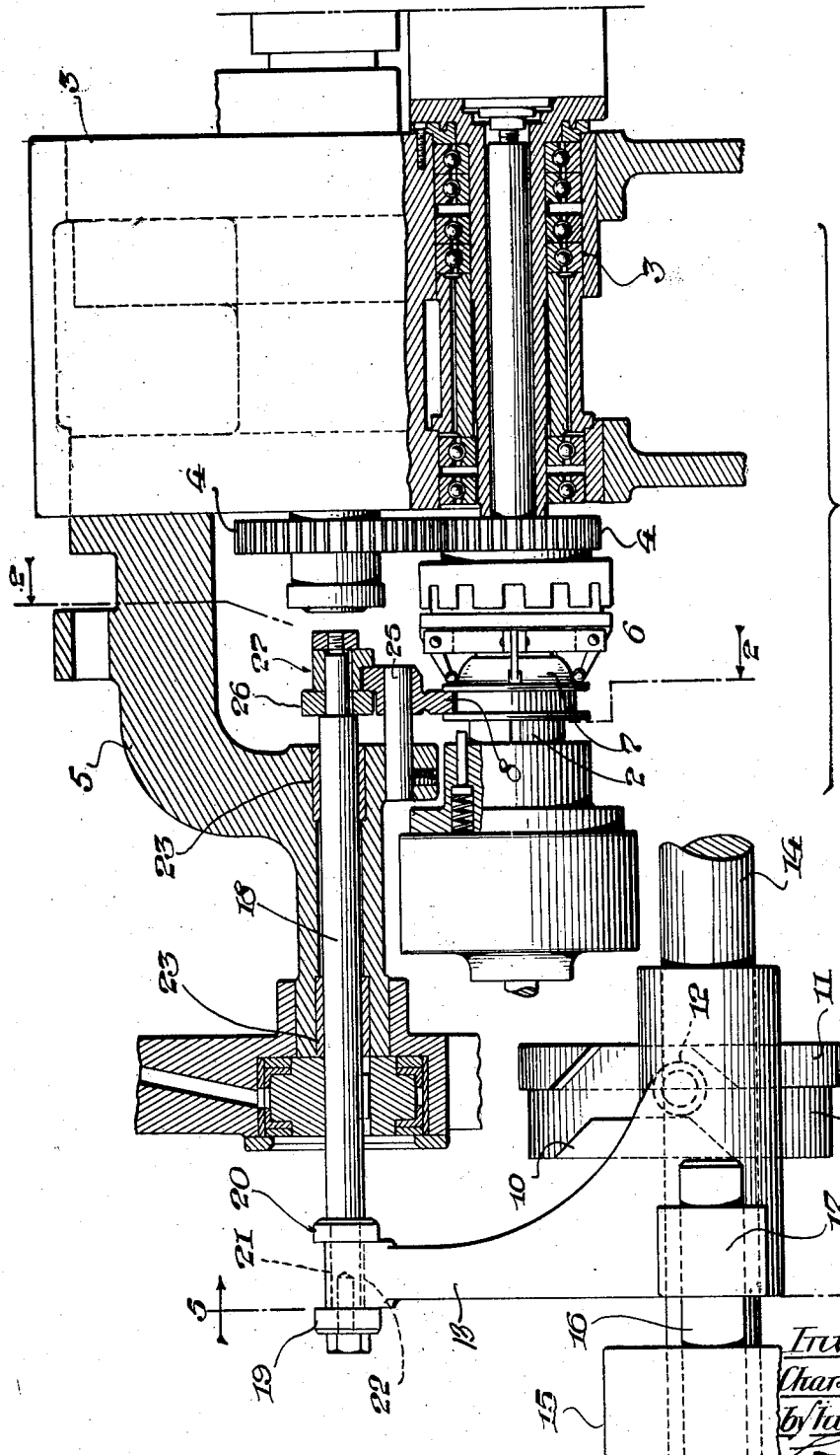
Figure 1 is a partly-sectional rear end view of so much of a chucking machine as is necessary to illustrate the present improvement.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The chuck spindles 2 are carried by an indexable turret or spindle carrier 3 and are rotated by suitable gearing 4 in the usual manner and to this spindle carrier is secured a spider 5 indexable with the carrier and the chuck spindles and these spindles are stopped and released by means of suitable multiple disc clutches 6 operated by suitable clutch shifting mechanism comprising a clutch operating wedge or spool 7 shifted back and forth by a fork 8 in the manner about to be described.

On a revolving drum 9 carried by a suitable shaft as the cam shaft of the machine are located cams 10 and 11 in position to contact with a roller 12 secured to a sliding arm 13. This arm 13 is mounted so as to slide on a stationary shaft 14 which is secured in a bracket 15 carried by the frame work of the machine. This bracket 15 also carries a short guide shaft 16 projecting into a laterally extending arm 17 of the arm 13, thereby holding the arm in an upright position, but permits the arm 13 to slide thereon and on its shaft 14. Connected to the upper end of the arm 13 for sliding movement therewith is a sliding shaft 18, the connection of these parts being by means of a pair of collars 19 and 20. This shaft 18 has a squared portion 21 at its end which fits a slot 22, see Fig. 5, of the arm 13 thus preventing turning movement of the shaft 18, but permitting separation of these parts and the rotatory adjustment of the shaft 18 for the purpose hereinafter described. The sliding shaft 18 projects through the center of the spider 5 and is suitably supported by a pair of bushings 23. The spider as hereinbefore stated, is secured to the spindle carrier between the spindles, and therefore indexes with the spindles and the carrier.

A shifter fork 8 is provided for each of the spindles, four in the present instance being shown, the forked end thereof being received by the groove of the clutch operating wedge, hereinbefore described. Each fork is carried by a short shaft 25, being free to slide thereon, the shaft being secured in the spider and indexable therewith. When the spindle carrier, chuck spindles and spider are indexed, the forks are also indexed into position to carry their inner ends successively into position between a round collar 26 and a flanged collar 27, see Fig. 7, secured to the inner end of the sliding shaft 18. Consequently, when the sliding shaft 18 is shifted by the arm 13 through the cams 10 and 11 hereinbefore described, the successive forks are shifted to operate the clutches of the chuck spindles first to stop and then release a spindle when such chuck spindles have been indexed into position where it is desired to stop them.

The collars 26 and 27 are keyed to the sliding shaft 18 and thereby maintain the same position at all times, since this sliding shaft does not rotate. By turning the shaft 18 in the arm 13, the collars 26 and 27 keyed thereto are turned therewith and thus brought into position to operate successively upon the clutch shifters in either the first or second or other positions of the spindles, as may be desired, without the addition of a single part; and when it is desired to stop more than one spindle at the same time, the flange or projection of the collar 27 is extended or widened so as to engage several of the clutch shifters at the same time, either in succession or alternation, as may be desired. In Fig. 4, for instance, two of the forks are being operated simultaneously by this improved spindle stopping mechanism to stop two of the spindles at the same time when indexed into the proper positions for this purpose, and obviously more than two can be simultaneously stopped, if desired, by merely widening the flange of the collar 27.

Thus it will be observed that by the mere adjustment or turning of the shaft 18 relatively to the arm 13 and the collars 26 and 27 carried thereby, and without the addition of any other parts, each of the chuck spindles can be stopped when it reaches a predetermined position, as first, second, third or fourth position; and that by a mere change of the collar 27 on the shaft 18, for one having a wider or differently-arranged flange or projection, more than one spindle can be stopped at the same time.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a metal working machine having a spindle carrier provided with a plurality of rotary spindles and clutch mechanism for stopping and releasing said spindles, including indexable clutch shifters, the combination of means for operating the clutch shifters and settable into different positions to stop the rotation of any one of the spindles.

2. In a metal working machine having a spindle carrier provided with a plurality of rotary spindles and clutch mechanism for stopping and releasing said spindles, including indexable clutch shifters, the combination of means for simultaneously operating a plurality of clutch shifters thereby to stop the rotation of a plurality of spindles simultaneously.

3. In a metal working machine having a spindle carrier provided with a plurality of rotary spindles and clutch mechanism for stopping and releasing said spindles, including indexable clutch shifters, the combination of means for operating the clutch shifters and adjustable into different positions to stop the rotation of any one of the spindles or for simultaneously operating a plurality of clutch shifters.

4. In a metal working machine having a spindle carrier provided with a plurality of rotary spindles and clutch mechanism for stopping and releasing said spindles, including indexable clutch shifters, the combination of means adjustable into different positions for operating the clutch shifters, said carrier and means being indexable one relatively to the other, whereby the rotation of any one of the spindles may be stopped.

5. In a metal working machine having an indexable spindle carrier provided with a plurality of rotary spindles and clutch mechanism for stopping and releasing said spindles, including indexable clutch shifters, the combination of means located centrally of the spindles and adjustable into different positions to operate the clutch shifters in any of the indexed positions of the spindles, and means for operating said means.

6. In a metal working machine having an indexable spindle carrier provided with a plurality of rotary spindles and clutch mechanism for stopping and releasing said spindles, including indexable clutch shifters, the combination of means located centrally of the spindles and effective to operate a plurality of the clutch shifters simultaneously, and means for operating said means.

7. In a metal working machine having an indexable spindle carrier provided with a plurality of rotary spindles and clutch mechanism for stopping and releasing said spindles, including indexable clutch shifters, the combination of a sliding shaft located centrally of the spindles, means for sliding it, and means carried by said shaft and effective to operate one or more of the clutch shifters in any of the indexed positions of the spindles.

8. In a metal working machine having an indexable spindle carrier provided with a plurality of rotary spindles and clutch mechanism for stopping and releasing the spindles, including indexable clutch shifters, the combination of a sliding arm, located in the rear of the clutch mechanism, means for sliding it, a sliding shaft rotatably adjustable relatively to the arm, and means carried by said shaft for operating one or more of the clutch shifters in any of the indexed positions of the spindles.

9. In a spindle stopping mechanism for metal working machines having a spindle carrier having a plurality of spindles and clutch mechanisms, one for each spindle including a plurality of indexable clutch shifter means, the combination of a sliding arm located rearwardly of the clutch shifting means, means for sliding it, a shaft carried thereby and means carried by said shaft for engaging any one or more of the clutch shifter means.

10. In a spindle stopping mechanism for metal working machines having a spindle carrier having a plurality of spindles and clutch mechanisms, one for each spindle including a plurality of indexable clutch shifter means, the combination of a sliding arm, means for sliding it, a shaft carried thereby for sliding movement therewith and rotatably adjustable relatively to said arm, and means carried by said shaft for rotation therewith to engage any one or more of the clutch shifter means.

11. In a spindle stopping mechanism for metal working machines having a spindle carrier having a plurality of spindles, the combination of a clutch for each spindle, an indexable slidable fork engaging each clutch, means for shifting said fork and comprising a sliding arm, means for supporting it, means for sliding it, a shaft shiftable with the arm and rotatably adjustable relatively thereto to engage or disengage said fork, and means carried by the shaft for engaging the fork thereby to shift it.

12. In a spindle stopping mechanism for metal working machines having a spindle carrier having a plurality of spindles, the combination of a plurality of clutches and a plurality of slidable forks engaging said clutches, means for shifting said forks and comprising a sliding arm, means for supporting it, means for sliding it, a shaft shiftable with the arm and rotatably adjustable relatively thereto, and means carried by the shaft for engaging any of the forks or a plurality thereof simultaneously thereby to stop a plurality of spindles at the same time.

13. In a metal working machine having an indexable spindle carrier provided with a plurality of rotatable spindles and means indexable with the spindle carrier for stopping and releasing said spindles, the combination of means settable into different positions to operate said stopping and releasing means in any of the indexed positions of the spindles.

14. In a metal working machine having an indexable spindle carrier provided with a plurality of rotatable spindles and means indexable with the spindle carrier for stopping and releasing said spindles, the combination of means settable into different positions to operate simultaneously a plurality of said stopping and releasing means in any of the indexed positions of the spindles.

15. In a metal working machine having a spindle carrier provided with a plurality of rotatable spindles and means for stopping and releasing said spindles, the combination of indexable and adjustable means effective to operate the stopping and releasing means of any of the spindles and means for operating said indexable means.

16. In a metal working machine having a spindle carrier provided with a plurality of rotatable spindles and means for stopping and releasing said spindles, the combination of indexable and adjustable means effective to operate the stopping and releasing means of any of the spindles or a plurality thereof simultaneously and means for operating said indexable means.

17. In a metal working machine having a spindle carrier provided with a plurality of rotatable spindles and indexable means for stopping and releasing said spindles, the combination of means shiftable in a circular path into position and effective to operate the stopping and releasing means of any of the spindles.

18. In a metal working machine having a spindle carrier provided with a plurality of rotatable spindles and indexable means for stopping and releasing said spindles, the combination of means shiftable in a circular path into position and effective to operate the stopping and releasing means of any of the spindles or a plurality thereof simultaneously.

19. In a metal working machine having an indexable spindle carrier provided with a plurality of rotatable spindles and means indexable with the spindle carrier for successively stopping and releasing said spindles, the combination of means for operating said stopping means and operative in any of the several indexable positions of the spindles.

20. In a metal working machine having an indexable spindle carrier provided with a plurality of rotatable spindles and means indexable with the spindle carrier for successively stopping and releasing said spindles, the combination of means for operating said stopping means and operative in any of the several indexable positions of the spindles and including a sliding shaft and means for sliding it.

21. In a metal working machine having an indexable spindle carrier provided with a plurality of rotatable spindles, the combination of clutch mechanism for stopping and releasing said spindles and including clutch shifters indexable with the spindle carrier, means located centrally of the clutch shifters and rotary spindles for controlling said clutch shifters, and means for operating said means.

22. In a metal working machine having an indexable spindle carrier provided with a plurality of rotatable spindles, the combination of clutch mechanism for stopping and releasing said spindles and including clutch shifters indexable with the spindle carrier, means located centrally of the clutch shifters and rotary spindles for controlling said clutch shifters, and means for operating said means and located rearwardly of the clutch mechanism.

Signed at Windsor, Vermont, this 15th day of June, 1928.

CHAS. Q. GAREY.